(12) United States Patent
Lamparter et al.

(10) Patent No.: US 6,435,075 B1
(45) Date of Patent: Aug. 20, 2002

(54) FLUID ACTUATOR FOR HINGED VEHICLE SAFETY DEVICES

(75) Inventors: Ronald C. Lamparter, Grosse Pointe Shores; James A. Haigh, Shelby Township; Richard J. Iminski, St. Clair Shores, all of MI (US)

(73) Assignee: Transpec, Inc., Sterling Heights, MI (US)

( * ) Notice: Subject to any disclaimer, the term of this patent is extended or adjusted under 35 U.S.C. 154(b) by 0 days.

(21) Appl. No.: 09/798,149

(22) Filed: Mar. 2, 2001

(51) Int. Cl.$^7$ ................................ F16J 1/10; F01B 9/00
(52) U.S. Cl. ...................... 92/129; 92/130 B; 92/140
(58) Field of Search ............................ 92/129, 130 B, 92/140

(56) References Cited

U.S. PATENT DOCUMENTS

| | | | |
|---|---|---|---|
| 5,357,239 A | | 10/1994 | Lamparter |
| 5,719,553 A | | 2/1998 | Lamparter |
| 5,796,331 A | * | 8/1998 | Lamparter .................. 340/433 |

* cited by examiner

*Primary Examiner*—Edward K. Look
*Assistant Examiner*—Michael Leslie

(74) *Attorney, Agent, or Firm*—Reising, Ethington, Barnes, Kisselle, Learman & McCulloch, P.C.

(57) ABSTRACT

A fluid actuator attaches a hinged safety device to a vehicle and pivots the hinged safety device between retracted and extended positions. The housing of the actuator has a base and a removable cover. A sub-assembly is attached to the base. The subassembly includes a generally planar base member with integral right cylinder, lever arm pivot support and stop posts. A piston slides in the right cylinder and forms a fluid chamber between the piston and a closed end of the right cylinder that is fed through a passage through the closed end of the cylinder. A lever arm is pivotally attached to the lever arm pivot support at one end for pivotal movement between retracted and extended positions, the lever arm extending over the cylinder and having a lip at an opposite end that is spaced from the right cylinder. A pivot arm engages the top of the piston at one end and the lever arm at an opposite end to transfer motion from the piston to the lever arm. The lever arm transfers motion to a rotor that is rotationally mounted in the housing for movement between retracted and extended positions. The rotor has a spool at each end and an eccentric arm between the spools at the respective ends of the rotor that engages the lip of the lever arm. A torsion spring encircles each spool with one end engaging the rotor and an opposite end engaging a stop post so that the eccentric arm is biased against the lip of the lever arm and the rotor and the lever arm are biased to their respective retracted positions.

12 Claims, 3 Drawing Sheets

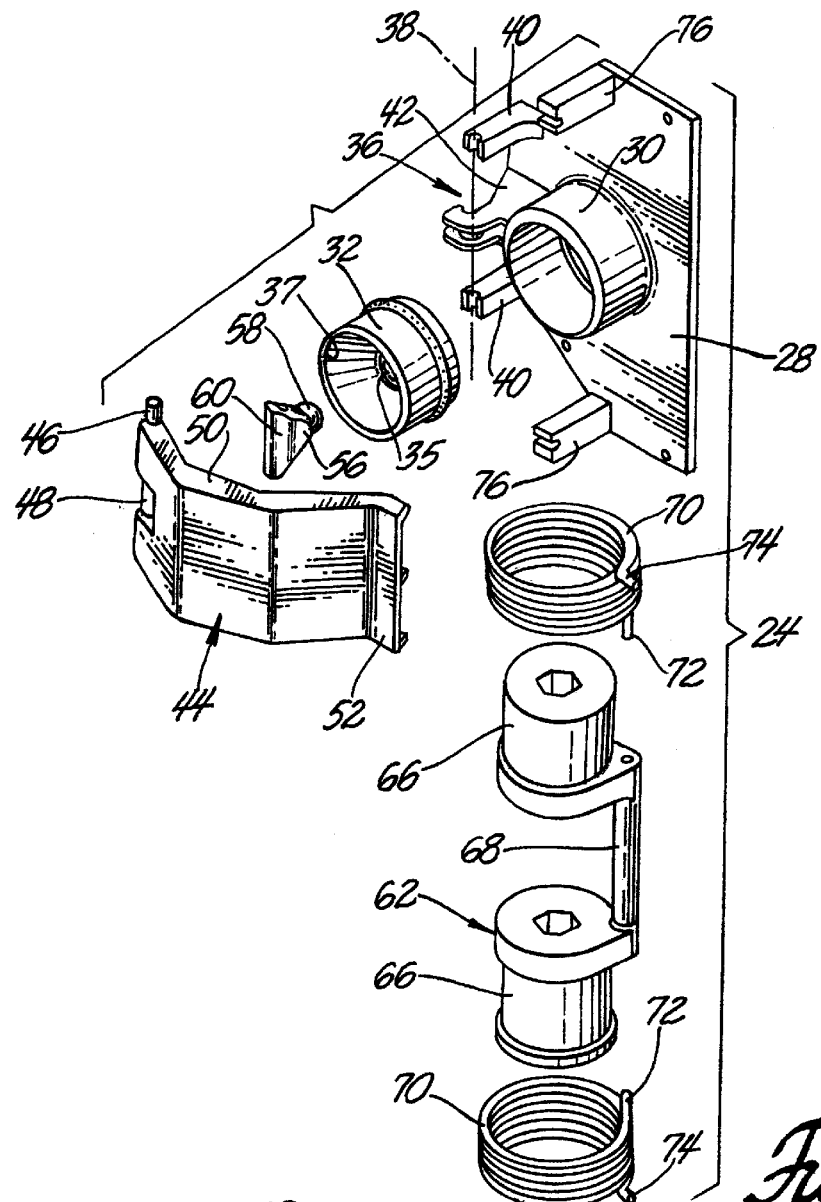
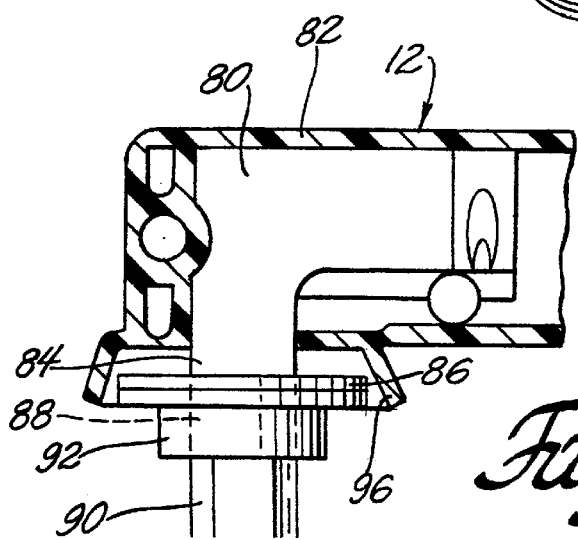

FLUID ACTUATOR FOR HINGED VEHICLE SAFETY DEVICES

This invention relates hinged vehicle safety devices and more particularly to actuators for hinged vehicle safety devices.

BACKGROUND OF THE INVENTION

U.S. Pat. No. 5,357,239 granted to Ronald C. Lamparter Oct. 18, 1994 discloses an actuating device for operating a safety unit, such as a crossing arm or a stop sign, that moves between a retracted position adjacent the vehicle and an extended position extending outwardly from the vehicle. A housing is mounted on the vehicle and a bracket is pivotally mounted on the housing for movement about a vertical pivot axis between a retracted position and an extended position. The actuating device includes a drive mechanism having a drive unit for pivoting the bracket about the pivot axis and an electric motor for driving the drive unit.

U.S. Pat. No. 5,719,553 granted to Ronald C. Lamparter Feb. 17, 1998 discloses a sealed actuator assembly for hinged vehicle safety devices, such as a crossing arm or a stop sign. The sealed actuator assembly is attached to the vehicle and includes the electrical and mechanical components that pivot the hinged safety device from a stored position adjacent the bus to an operative position extending outwardly of the bus. These components and wiring harnesses are protected in an outer sealed housing that has a removable cover to facilitate installation and repair. Installation and repair is further enhanced by a removable inner housing sub-assembly that carries a motor control circuit for the electric motor and provides additional protection for the electric motor.

The actuators described above are very satisfactory for their intended purpose. However, both actuators use an electric motor to pivot the vehicle safety device, which is fine because all vehicles include an electric storage battery for a power source. On the other hand, some vehicles and school busses in particular, normally include a fluid power source such as an air pump for operating other systems and accessories. The fluid power source may be preferred over the electrical power source for one reason or another. However, the fluid power source cannot operate the actuators described above.

SUMMARY OF THE INVENTION

This invention provides an actuator assembly for hinged vehicle safety devices, such as a stop sign or a crossing arm, that is fluid operated, preferably by pressurized air. The actuator assembly has a housing with a cylinder attached inside the housing. A piston slides in the cylinder and forms a fluid chamber between the piston and a closed end of the cylinder. A passage extends into the housing and opens into the fluid chamber. A lever arm is pivotally supported at one end inside the housing for pivotal movement between retracted and extended positions, the lever arm extending over the cylinder and having a lip at an opposite end that is spaced from the cylinder. A pivot arm engages an upper surface of the piston at one end and the lever arm at an opposite end to transfer motion from the piston to the lever arm. A rotor is rotationally mounted in the housing for movement between retracted and extended positions, the rotor having a spool at one end and an eccentric arm next to the spool that engages the lip of the lever arm. A torsion spring encircles the spool with one end engaging the rotor and an opposite end engaging a stop in the housing so that the eccentric arm is biased against the lip of the lever arm and the rotor and the lever arm are biased to their respective retracted positions. When pressurized air is admitted to the chamber, the piston extends and pivots the lever arm toward the extended position. The lever arm in turn rotates the rotor and the safety device attached to it toward the extended position.

The rotor preferably has a spool and a torsion spring at each end for balanced operation. In another preferred form, the piston has a deep cavity in an upper surface that includes a concentric ball socket, and the pivot arm has a ball at the one end that engages the ball socket to minimize height requirements. The housing preferably has a base and a removable cover while several internal parts preferably form a sub-assembly to make assembly easier. To this same end, the actuator preferably includes a lever arm pivot attachment that is an integral part of the base member of the subassembly and that is designed to permit snap assembly of the lever arm to the lever arm pivot attachment.

BRIEF DESCRIPTION OF THE DRAWING

The above and objects, features and advantages of the invention will become more apparent from the following description taken in conjunction with the accompanying drawings wherein like references refer to like parts and wherein:

FIG. 5 is an exploded perspective view of a sub-assembly of the fluid actuator that is shown in FIG. 2; and FIG. 6 is a sectional view of a portion of the hinged stop sign that is shown in FIG. 2.

DESCRIPTION OF THE PREFERRED EMBODIMENT

Figure 1:
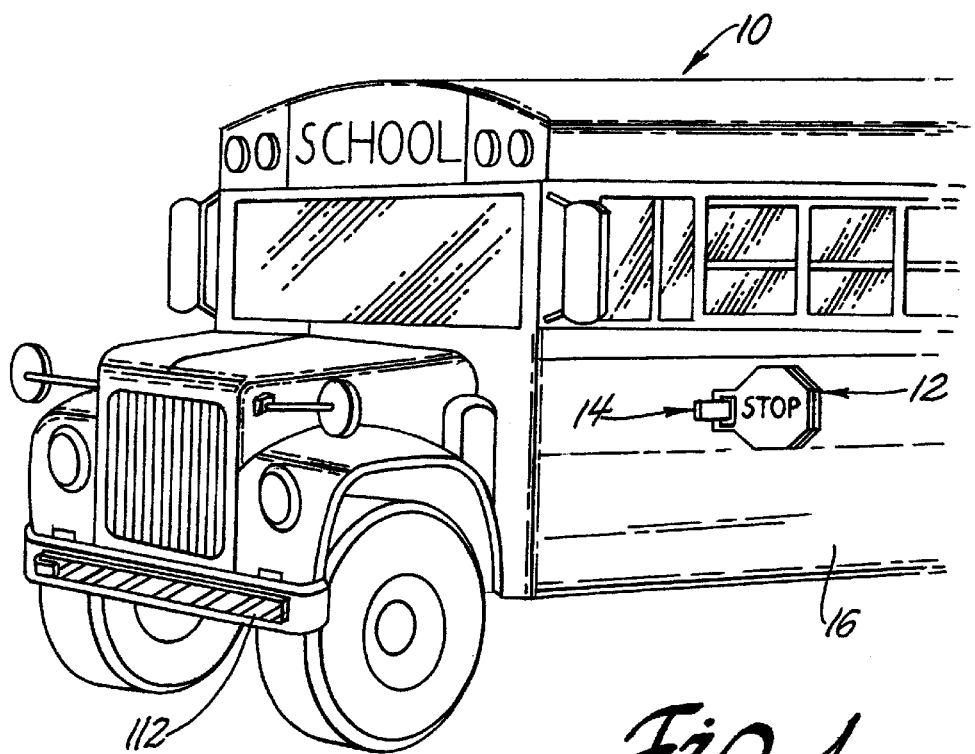
FIG. 1 is a perspective view of a school bus equipped with a hinged stop sign and a hinged crossing arm and a fluid actuator of the invention for pivoting the hinged stop sign and an identical assembly for pivoting the hinged crossing arm.

Referring now to the drawing, FIG. 1 shows a school bus 10 equipped with a hinged stop sign 12 and a fluid actuator 14 of the invention. Actuator 14 is attached to the body side panel 16 of the bus and pivots stop sign 14 between a stored or retracted position adjacent the body side panel 16 and an extended position where stop sign 12 is substantially perpendicular to the body side panel 16.

Figure 3:
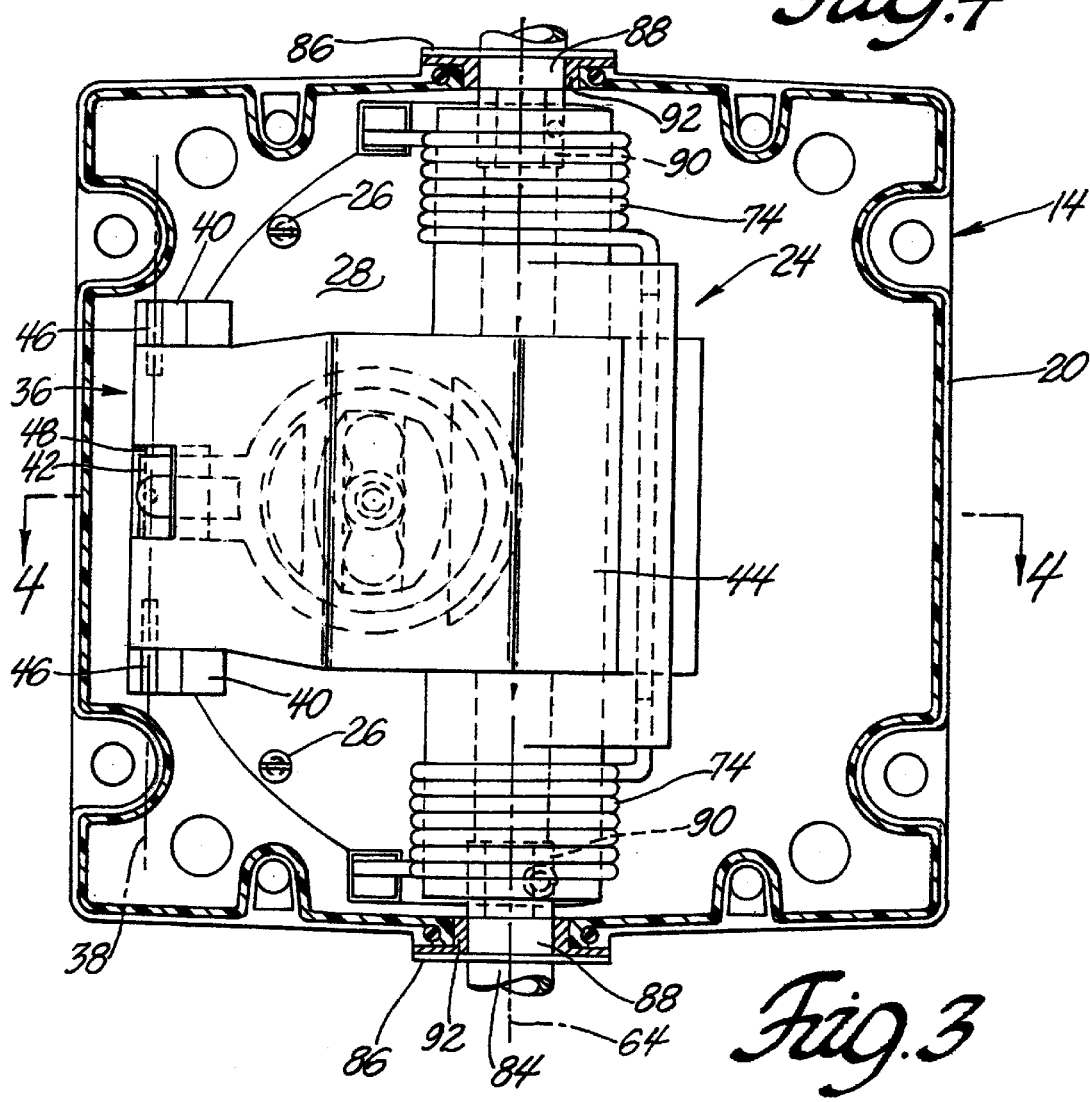
FIG. 3 is an enlarged from view of the fluid actuator of FIG. 2 with the cover removed to show internal detail.

Actuator 14 comprises a housing 18 that has a base 20 and a removable cover 22. Housing 18 is preferably sealed to protect internal components from the environment. The internal components are preferably formed into a subassembly 24 that is illustrated best in FIG. 5 and that is fastened to the bottom of base 20 by screws 26 when cover 22 is removed as shown in FIG. 3.

Subassembly 24 comprises a generally planar base member 28 that has a right cylinder 30 attached to it so that right cylinder 30 has a closed end at the base member and an open end spaced from the base member. Piston 32 slides in right cylinder 30 and forms a fluid chamber 33 between the piston and the closed end of the right cylinder that communicates with a fluid power source 98 via passage 34 that extends through the closed end of cylinder 30 and the bottom of base 20. Cylinder 30 is preferably an integral part of base member 28 for economy in which case passage 34 extends through base member 28.

The outer end surface of piston 32 has a concentric ball socket 35 with the ball socket 35 preferably located at the bottom of a deep cavity 37 in the outer end surface of piston 32 that converges to the ball socket 35. Cavity 37 cooperates in minimizing height requirements for housing 28 as explained below.

Base member 20 also has a lever arm pivot support 36 that is attached to it to define a pivot axis 38 that is spaced outwardly of cylinder 30 and that is substantially parallel to the generally planar base member 28. The lever arm pivot support 36 comprises laterally spaced supports 40 and a retainer 42 disposed between the laterally spaced supports 40. Supports 40 and retainer 42 are preferably an integral part of base member 28 for economy. Retainer 42 is also preferably integrally attached to cylinder 30 by an extension for increased strength.

Figure 4:
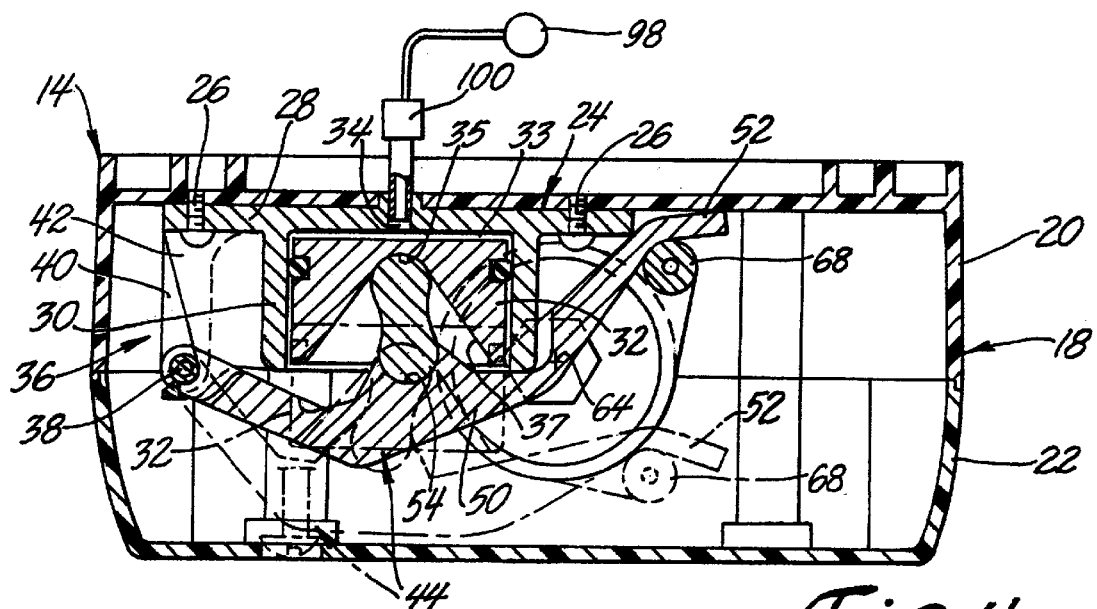
FIG. 4 is a section taken substantially along the line 4—4 of FIG. 3 looking in the direction of the arrows.

A lever arm 44 is pivotally attached to the lever arm pivot support 36 at one end so that the lever arm swings between a retracted position shown in solid line in FIG. 4 and an extended position shown in phantom line in FIG. 4. More specifically, lever arm 44 has laterally extending end pins 46 that nest in semi-cylindrical grooves in the tops of supports 40 and a concentric center pin 48 that fits under a curved hook at the top of retainer 42 to locate the three concentric pins on pivot axis 38. The end of lever arm 44 and pivot support 36 are resilient enough so that end pins 46 and center pin 48 can be snapped into place to facilitate assembly.

The pivotally attached lever arm 44 has a generally concavo-convex body 50 that extends over cylinder 30 and terminates in a lip 52 that is spaced from cylinder 30. The concave side of body 50 faces the open end of cylinder 30 to minimize height requirements for housing 18. The concave side of body 50 also has a semi-cylindrical seat 54 that is parallel to pivot axis 38 and that is located near the center of cylinder 30.

Subassembly 24 further includes a pivot arm 56 that has a ball 58 at one end that engages ball socket 35 of piston 32 and a cylindrical nose 60 at an opposite end that engages seat 54 of lever arm 44.

Fluid actuator 14 has a rotor 62 that is rotationally mounted in housing 20 by the hinged stop sign 12 for rotation about an axis 64 that is parallel to axis 38 as explained below. Rotor 62 has a spool 66 at each end and an eccentric arm 68 between the spools at the respective ends of the rotor. Eccentric arm 68 engages lip 52 of lever arm 44. Thus rotor 62 is rotated substantially 90 degrees from a retracted position shown in solid line to an extended position shown in phantom line in FIG. 4 when lever arm 44 is moved between these respective positions by piston 32.

A torsion spring 70 encircles each spool 66 with one end 72 anchored in a hole in rotor 66 and an opposite end 74 engaging a groove in the top of spring stop posts 76 that are attached to base member 28. Torsion springs 70 bias rotor 62 to the retracted position, that is, counterclockwise as shown in FIG. 4. This also biases lever arm 44 counterclockwise to the retracted position shown in solid line in FIG. 4 where lip 52 engages the bottom of base 20. Posts 76 are preferably an integral part of base member 28 for economy.

Figure 2:
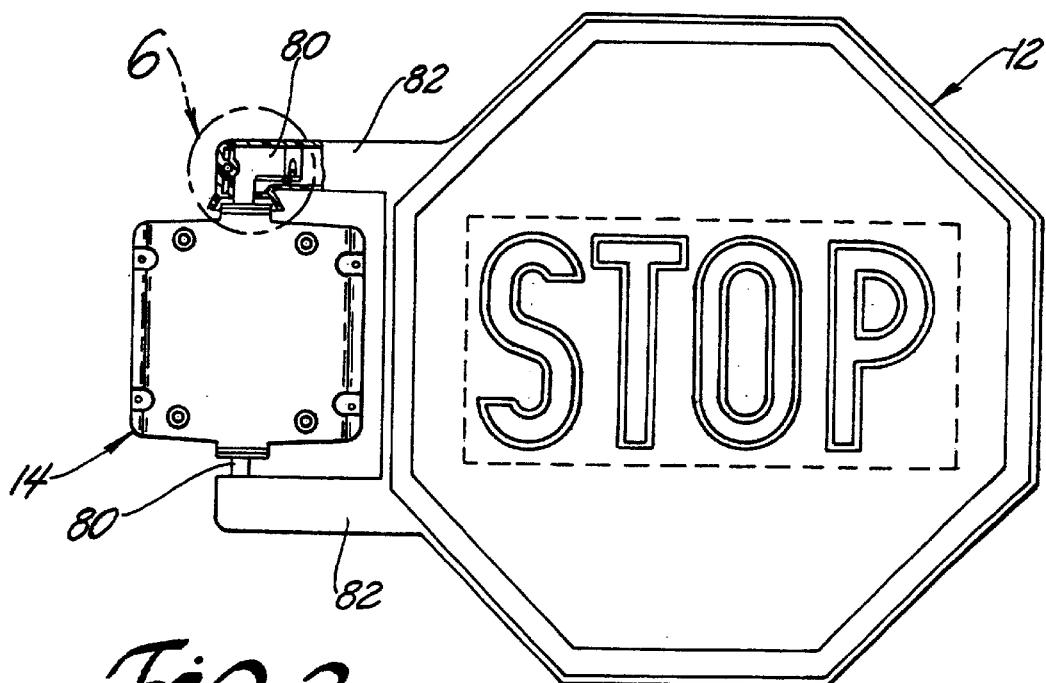
FIG. 2 is a front view of the hinged stop sign and the fluid actuator that is shown in FIG. 1.

Stop sign 2 mounts rotor 62 rotationally in housing 18 by means of two hollow L-shaped arms 80 that are shown and described in detail in U.S. Pat. Nos. 5,687,500 and 5,796,331 granted to Ronald C. Lamparter Nov. 18, 1997 and Aug. 18, 1998 respectively. As shown in FIGS. 2, 3 and 6, the L-shaped arms 80 are mounted in the hollow ends of vertically spaced hinge members 82 of stop sign 12 with a vertical leg 84 that protrudes through a hole of the respective hinge member 82 and extends inwardly. Each vertical leg 84 has a flange 86, a round portion 88 outwardly of the flange, and a reduced end portion that is not round, such as the hexagonal end portion 90. Each round portion 88 rides in a flanged brass collar 92 while each hexagonal end portion 90 fits into a correspondingly shaped, concentric recess in the end of a respective spool 66 of rotor 62.

Base 20 and cover 22 each have two semicircular recesses opposite each other in their respective side walls that form two round holes for supporting the flanged brass collars 92 when the cover 22 is attached to base 20. The brass collars 20 are cradled and held in the recesses of the base 20 by the recesses of the cover 22. The cover 22 thus acts in the manner of a bearing cap so that the brass collars 92 can be seated in the cradles of base 20 when the cover 22 is removed for installation of sub-assembly 24. Brass collars 92 are then held in place when cover 22 is attached which completes the rotational mounting of rotor 62 in housing 18.

In order to protect the interior of sealed housing 18 against the intrusion of water, snow, ice and other deleterious matter into the housing 18 via the upper round hole for the upper brass collar 92 and L-shaped arm 80, the upper hinge member 82 of stop sign 12 preferably has a flared annular skirt 96 that covers the hole and the flanges of upper brass collar 92 and arm 80 like an umbrella.

The fluid actuator 14 operates in the following manner. When bus 10 stops to pick-up or discharge passengers fluid, preferably air, under pressure from source 98 is admitted into chamber 33 via a fluid control valve 100 and passage 34. Fluid power sources and fluid control valves are well known and thus need not be shown or described in detail. Thus fluid power source 98 and fluid control valve 100 are merely shown schematically in FIG. 4. As pressurized fluid is admitted into chamber 33, chamber 33 expands pushing piston 32 outwardly. Piston 32 in turn pivots lever 44 clockwise from the retracted position shown in solid line in FIG. 4 to the extended position shown in phantom. Lever 44 in turn pivots rotor 92 clockwise substantially 90° from the solid line retracted position to the phantom line extended position. Stop sign 12 being attached to rotor 92, swing substantially 90° from a stored position adjacent side wall 16 of bus 10 to an extended or operative position substantially perpendicular to the side wall. It should be noted that arm 68 is spaced from cover 22 when sign 12 is in the extended Position. This allows sign 12 to travel past the extended perpendicular position without damaging actuator 14 in case sign 12 pushed past the extended position. After the passengers have been taken on or discharged, fluid control valve 100 is operated to exhaust chamber 33, and piston 32 is retracted by torsion springs 74 which also retracts stop sign 12, rotor 92 and lever 44 to their respective retracted positions.

While the invention has been illustrated and described in detail in connection with a hinged stop sign 12, the fluid actuator 14 can also be used for other hinged safety devices such as a hinged crossing arm assembly 112 that is shown in FIG. 1. Such crossing arm assemblies are well known and are pivoted substantially 90° from a retracted position against the front bumper of the bus 10 to an extended position substantially perpendicular to the bumper. Moreover, while the fluid actuator 14 is preferably operated by pressurized air which is clean cheap and easy to handle, the fluid actuator 14 may be operated by any gas, by vacuum or even by liquids such as hydraulic fluid or oil, with the proper well known modifications.

In other words, many modifications and variations of the present invention are possible in light of the above teachings. It is therefore, to be understood that, within the scope of the appended claims, the invention may be practiced otherwise than as specifically described.

I claim:

1. A fluid actuator for attaching a hinged safety device to a vehicle and pivoting the hinged safety device between retracted and extended positions comprising:

a housing having a right cylinder attached to the housing inside the housing, the right cylinder having a closed end and an open end, a piston that slides in the right cylinder and forms a fluid chamber between the piston and the closed end of the right cylinder, a passage that extends into the housing and opens into the fluid chamber, a lever arm pivot support inside the housing that defines a pivot axis, a lever arm pivotally attached to the lever arm pivot support at one end for pivotal movement about the pivot axis between retracted and extended positions, the lever arm extending over the cylinder and having a lip at an opposite end that is spaced from the right cylinder, a pivot arm that engages an upper surface of the piston at one end and that engages the lever arm at an opposite end, a rotor that is rotationally mounted in the housing for movement between retracted and extended positions, the rotor having a spool at one end and an eccentric arm engaging the lip of the lever arm, and a torsion spring encircling the spool with one end engaging the rotor and an opposite end engaging a stop in the housing so that the eccentric arm is biased against the lip of the lever arm, and the rotor and the lever arm are biased to their respective retracted positions.

2. The fluid actuator as defined in claim 1 wherein the piston has a cavity in an upper surface that includes a concentric ball socket, and the pivot arm has a ball at the one end that engages the ball socket.

3. The fluid actuator as defined in claim 2 wherein the lever arm has a seat between the one end and the opposite end of the lever arm, and the pivot arm has a nose at the opposite end that engages the seat of the lever arm.

4. A fluid actuator for attaching a hinged safety device to a vehicle and pivoting the hinged safety device between retracted and extended positions comprising:

a housing having a base and a cover, a right cylinder attached to the base, the right cylinder having a closed end and an open end that faces the cover, a piston that slides in the right cylinder and forms a fluid chamber between the piston and the closed end of the right cylinder, the piston having a cavity in an upper surface that includes a concentric ball socket, the base having a passage extending through it and opening into the fluid chamber, a lever arm pivot support that is attached to the base and that defines a pivot axis, a lever arm pivotally attached to the lever arm pivot support at one end for pivotal movement about the pivot axis between retracted and extended positions, the lever arm extending over the cylinder and having a lip at an opposite end that is spaced from the right cylinder, the lever arm having a seat near a centerline of the cylinder, a pivot arm that has a ball at one end that engages the ball socket of the piston and a cylindrical nose at an opposite end that engages the seat of the lever arm, a rotor that is rotationally mounted in the housing for movement between retracted and extended positions, the rotor having a spool at each end and an eccentric arm between the spools at the respective ends of the rotor, the eccentric arm engaging the lip of the lever arm, and a torsion spring encircling each spool with one end engaging the rotor and an opposite end engaging a stop that is attached to the base so that the eccentric arm is biased against the lip of the lever arm and the rotor and the lever arm are biased to their respective retracted positions.

5. The fluid actuator as defined in claim 4 wherein the eccentric arm of the rotor is spaced from the cover when the rotor is in the extended position to permit over travel of the rotor.

6. A fluid actuator for attaching a hinged safety device to a vehicle and pivoting the hinged safety device between retracted and extended positions comprising:

a housing having a base and a removable cover, a generally planar base member disposed in the housing, a right cylinder attached to the base member, the right cylinder having a closed end at the base member and an open end spaced from the base member, a piston that slides in the right cylinder and forms a fluid chamber between the piston and the closed end of the right cylinder, the piston having a cavity in an upper surface that includes a concentric ball socket, the base member having a passage extending through it and opening into the fluid chamber, a lever arm pivot support that is attached to the base member and that defines a pivot axis substantially parallel to the generally planar base member, the lever arm pivot support comprising laterally spaced supports and a retainer disposed between the laterally spaced supports, a lever arm pivotally attached to the lever arm pivot support at one end for pivotal movement between retracted and extended positions, the lever arm extending over the cylinder and having a lip at an opposite end that is spaced from the right cylinder, the lever arm having a semi-cylindrical seat near a centerline of the cylinder, a pivot arm that has a ball at one end that engages the ball socket of the piston and a cylindrical nose at an opposite end that engages the seat of the lever arm, a rotor that is rotationally mounted in the housing for movement between retracted and extended positions, the rotor having a spool at each end and an eccentric arm between the spools at the respective ends of the rotor, the eccentric arm engaging the lip of the lever arm, and a torsion spring encircling each spool with one end engaging the rotor and an opposite end engaging a stop post of the base member so that the eccentric arm is biased against the lip of the lever arm and the rotor and the lever arm are biased to their respective retracted positions.

7. The fluid actuator as defined in claim 6 wherein the supports have slots at the top, wherein the retainer has a hook at the top, and lever arm has a laterally extending end pins and a central pin, the laterally extending end pins being disposed in the slots of the support and the central pin being disposed under the hook of the retainer to pivotally attach the lever are to the lever arm pivot support.

8. The fluid actuator as defined in claim 7 wherein the lever arm and the lever arm pivot support are resilient enough to snap assembly the lever arm to the lever arm pivot support.

9. The fluid actuator as defined in claim 8 wherein the cylinder, the lever arm pivot support and the stop posts are an integral part of the base member.

10. The fluid actuator as defined in claim 9 wherein the base member, the lever arm pivot support, the stop posts, the pivot arm and the lever arm form a sub-assembly.

11. The fluid actuator as defined in claim 6 wherein the rotor is rotationally mounted in the housing by a hinged safety device that has upper and lower hinge members, the upper and lower hinge members having upper and lower legs respectively that protrude and extend inwardly toward the housing of the actuator, the upper and lower legs having upper and lower round portions respectively and upper and lower end portions respectively that are not round, the upper and lower round portions being rotationally disposed in upper and lower holes respectively, the upper and lower holes being formed by the base and the cover of the housing, the upper and lower end portions projecting into the housing and disposed in mating cavities in the ends of the respective spools of the rotor, and the upper hinge member having a flared skirt that covers the upper hole formed in the housing.

12. An actuator for attaching a hinged safety device to a vehicle and pivoting the hinged safety device between retracted and extended positions comprising:

a housing having a base and a removable cover, a rotor that is rotationally mounted in the housing for movement between retracted and extended positions by a hinged safety device that has upper and lower hinge members, the rotor having a cavity at each end that is not round, the upper and lower hinge members having upper and lower legs respectively that protrude and extend inwardly toward the housing of the actuator, the upper and lower legs having upper and lower round portions respectively and upper and lower end portions respectively that are not round, the upper and lower round portions being rotationally disposed in upper and lower holes respectively that are formed by the base and the cover of the housing, the upper and lower end portions projecting into the housing and disposed in respective cavities in the respective ends of the rotor, and the upper hinge member having a flared skirt that covers the upper hole formed in the housing.

\* \* \* \* \*

UNITED STATES PATENT AND TRADEMARK OFFICE
CERTIFICATE OF CORRECTION

PATENT NO.    : 6,435,075 B1
DATED         : August 20, 2002
INVENTOR(S)   : Ronald C. Lamparter, James A. Haigh and Richard J. Iminski It is certified that error appears in the above-identified patent and that said Letters Patent is hereby corrected as shown below:

Column 1,
Line 4, after "relates" insert therein -- to --.

Column 2,
Line 36, after "enlarged" delete "from" and insert therein -- front --.
Line 47, after "now to the" delete "drawing" and insert therein -- drawings --.

Column 3,
Line 33, after "generally" delete "concavo" and insert therein -- concave --.

Column 4,
Line 31, after "passengers" insert a comma.

Column 7,
Line 7, after "attach the lever" delete "are" and insert therein -- arm --.
Line 19, after "housing by" delete "a" and insert therein -- the --.

Column 8,
Line 10, after "extended positions by" delete "a" and insert therein -- the --.

Signed and Sealed this

Twenty-fourth Day of June, 2003

JAMES E. ROGAN
*Director of the United States Patent and Trademark Office*